US008605625B2

(12) United States Patent
Laroia et al.

(10) Patent No.: US 8,605,625 B2
(45) Date of Patent: Dec. 10, 2013

(54) METHODS AND APPARATUS FOR PEER DISCOVERY IN A COMMUNICATIONS SYSTEM

(75) Inventors: Rajiv Laroia, Far Hills, NJ (US); Junyi Li, Chester, NJ (US); Vincent D. Park, Budd Lake, NJ (US); Ying Wang, Easton, PA (US); Aleksandar Jovicic, Piscataway, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1225 days.

(21) Appl. No.: 12/417,383

(22) Filed: Apr. 2, 2009

(65) Prior Publication Data
US 2010/0254308 A1 Oct. 7, 2010

(51) Int. Cl.
*H04J 1/16* (2006.01)
*H04L 12/66* (2006.01)
*G06F 15/177* (2006.01)

(52) U.S. Cl.
USPC ............................ 370/255; 370/356; 709/221

(58) Field of Classification Search
None
See application file for complete search history.

(56) References Cited

U.S. PATENT DOCUMENTS

| | | | | |
|---|---|---|---|---|
| 6,810,259 | B1 * | 10/2004 | Zhang | 455/456.5 |
| 7,426,190 | B2 * | 9/2008 | Manjeshwar et al. | 370/254 |
| 7,899,017 | B2 * | 3/2011 | Yu et al. | 370/338 |
| 7,961,708 | B2 | 6/2011 | Li et al. | |
| 8,126,477 | B2 | 2/2012 | Dravida et al. | |
| 2003/0227911 | A1 * | 12/2003 | Trossen | 370/352 |
| 2005/0083886 | A1 * | 4/2005 | Ikeda | 370/331 |
| 2005/0100030 | A1 * | 5/2005 | Chaskar et al. | 370/401 |
| 2005/0259655 | A1 | 11/2005 | Cuervo et al. | |
| 2006/0094456 | A1 * | 5/2006 | Rittle et al. | 455/519 |
| 2006/0187858 | A1 * | 8/2006 | Kenichi et al. | 370/254 |
| 2006/0271690 | A1 * | 11/2006 | Banga et al. | 709/228 |
| 2007/0025342 | A1 * | 2/2007 | Obata | 370/352 |
| 2007/0058601 | A1 * | 3/2007 | Davis et al. | 370/338 |

(Continued)

FOREIGN PATENT DOCUMENTS

| | | |
|---|---|---|
| CN | 1522550 A | 8/2004 |
| CN | 1957568 A | 5/2007 |

(Continued)

OTHER PUBLICATIONS

International Search Report and Written Opinion—PCT/US2010/029498, International Search Authority—European Patent Office—Nov. 16, 2010.

(Continued)

*Primary Examiner* — Melanie Jagannathan
(74) *Attorney, Agent, or Firm* — Joseph B. Agusta

(57) ABSTRACT

Methods and apparatus supporting enhanced discovery operations in peer to peer networks are described. Peer discovery, based on direct peer to peer discovery between two mobile nodes can be somewhat limited, e.g., due to power limitations, processing power, and/or channel conditions. An access point, e.g., base station, monitors for and receives peer discovery signals conveying a set of identifiers from a wireless communications device. The access point retransmits at least one identifier in the set in a wireless peer to peer communications channel. Thus the access point effectively extends the peer discovery range for wireless communications devices utilizing the peer to peer network. Wireless communications devices can monitor for and recover the rebroadcast peer discovery signals from access points. Thus, via access point signaling a wireless communications device can be made situationally aware of other devices of interest which would be otherwise outside its discovery detection range.

34 Claims, 9 Drawing Sheets

(56) References Cited

U.S. PATENT DOCUMENTS

| | | | |
|---|---|---|---|
| 2007/0171910 A1* | 7/2007 | Kumar | 370/392 |
| 2007/0255834 A1* | 11/2007 | Abhishek et al. | 709/226 |
| 2008/0159228 A1* | 7/2008 | Kufner | 370/331 |
| 2009/0010179 A1 | 1/2009 | Laroia et al. | |
| 2009/0013081 A1* | 1/2009 | Laroia et al. | 709/228 |
| 2009/0016524 A1 | 1/2009 | Park et al. | |
| 2009/0019168 A1 | 1/2009 | Wu et al. | |
| 2009/0129291 A1* | 5/2009 | Gupta et al. | 370/254 |
| 2009/0222530 A1* | 9/2009 | Buford et al. | 709/217 |
| 2009/0285119 A1 | 11/2009 | Horn et al. | |
| 2011/0019582 A1* | 1/2011 | Okmyanskiy et al. | 370/254 |

FOREIGN PATENT DOCUMENTS

| | | |
|---|---|---|
| JP | 2007503788 A | 2/2007 |
| JP | 2008510380 A | 4/2008 |
| JP | 2008306603 A | 12/2008 |
| WO | 03092315 A1 | 11/2003 |
| WO | 2004103008 A1 | 11/2004 |
| WO | 2006020520 A2 | 2/2006 |
| WO | 2007024918 A2 | 3/2007 |

OTHER PUBLICATIONS

European Search Report—EP10759363—Search Authority—Munich—Sep. 5, 2013.

Supplementary European Search Report —EP10759363, Search Authority—The Hague, Sep. 5, 2013.

Taiwan Search Report—TW099110403—TIPO—Feb. 22, 2013.

Yanagihara K, "Location Technologies for Wireless Sensor Networks," Journal of the Institute of Electronics, Information and Communication Engineers, Apr. 1, 2009, vol. 92, No. 4, pp. 262-267.

* cited by examiner

METHODS AND APPARATUS FOR PEER DISCOVERY IN A COMMUNICATIONS SYSTEM

FIELD

Various embodiments relate to wireless communications, and more particularly, to methods and apparatus which can be used in a system which supports both peer to peer signaling and wide area network signaling.

BACKGROUND

In the field of wireless communications there has been a trend to make available and utilize spectrum for various types of networks in addition to conventional cellular networks. One such network type which has been gaining in popularity and utilization is a peer to peer network in which communications occur in a relatively local vicinity.

Peer to peer networks may have various advantages over cellular networks. For example, peer to peer networks may be well suited to communicate small amounts of payload information directly with low overhead. In addition peer to peer networks may be well suited to efficient communications in a small local region where channel conditions between the various devices are good. However, peer to peer networks may have some limitations in comparison to typical cellular networks, e.g., in terms of device discovery range and device communications range. In typical cellular network communications, an access point with its antenna situated in a favorable site, e.g., a high location, serves as an intermediary for mobile nodes in its cell. In addition the access point is coupled via a backhaul network to other access points providing a very large communications range. In contrast, in a peer to peer network wireless communications devices which may be interested in communicating with each other may have less than favorable channel conditions until they are very close, e.g., due to obstructions. As a result, the range and/or reliability of discovery between peer devices in a peer to peer network can be limited. This tends to negatively impact the effectiveness of utilizing a peer to peer network.

Based on the above discussion there is a need for new methods and apparatus that can improve discovery operations and/or increase discovery range in a peer to peer network.

SUMMARY

Methods and apparatus supporting enhanced discovery operations in peer to peer networks are described. Wireless communications devices, e.g., mobile nodes supporting peer to peer communications, in some embodiments, signal their presence to other peers in their vicinity through peer discovery signals and monitor for peer discovery signals from other devices. Peer discovery signals may include signals conveying private and/or public identifiers associated with a wireless communications device. Through peer discovery operations a wireless communications device may find other wireless communications devices of interest. For example, a wireless communications device may search for private and/or public identifiers corresponding friends, relatives, business associates, group members, common interests, businesses, services, etc. A wireless communications device may monitor for discovery signals, decode detected discovery signals and check recovered identifiers against identifiers of interest. Based on a match the wireless communications device may establish a peer to peer connection and/or communicate peer to peer traffic channel signals.

Peer discovery, based on direct peer to peer discovery between two mobile nodes can be somewhat limited, e.g., due to power limitations, processing power, and/or channel conditions. In accordance with a feature of some embodiments, an access point, e.g., base station, monitors for and receives peer discovery signals conveying a set of identifiers from a wireless communications device. The access point may, and sometimes does, retransmit at least one identifier in the set in a wireless peer to peer communications channel. In some embodiments, the access point also determines location information corresponding to a device from which a recovered identifier was communicated. In some, but not necessarily all, embodiments, the access point transmits device location information with the rebroadcast identifier. Access points which are coupled together via a backhaul network may interchange peer discovery information, interchange device location information, and/or work cooperatively to determine device location information. A single access point supports peer discovery identifier retransmission corresponding to multiple wireless communications devices.

Thus the access point effectively extends the peer discovery range for wireless communications devices utilizing the peer to peer network. Wireless communications devices can monitor for and recover the rebroadcast peer discovery signals and/or device location information from access points. Thus, via the efforts of the access point, a wireless communications device can be made situationally aware of other devices of interest which would be otherwise outside its discovery detection range. The wireless communications device can make intelligent decisions based on this discovery information communicated via the access point, e.g. change location, estimate an arrival time in which peer to peer communications will be possible with the device of interest, decide to initiate a WAN communications session with the device of interest because peer to peer communications will not be possible for an acceptable time in the future, etc.

In some embodiments, the access point searches on behalf of a wireless communications device for specific identifiers of interest and notifies the wireless communications device upon detection. In some such embodiments, the search extends beyond the cell of the access point, e.g., to the coverage region of an adjacent access point.

An exemplary method of operating an access point, e.g., a base station, in accordance with some embodiments, comprises: receiving a set of identifiers from a wireless communications device and transmitting at least one identifier in the received set of identifiers in a wireless peer to peer communications channel. An exemplary access point, in accordance with some embodiments, comprises: at least one processor configured to: receive a set of identifiers from a wireless communications device; and transmit at least one identifier in the received set of identifiers in a wireless peer to peer communications channel. The exemplary access point further comprises memory coupled to said at least one processor.

An exemplary method of operating a communications device, e.g., a wireless mobile node, in accordance with some embodiments, comprises: generating a set of identifiers corresponding to the communications device which are to be advertised by an access point on behalf of the communications device; and uploading, as part of peer to peer communication with said access point, the set of identifiers corresponding to the communications device. In some embodiments, the uploading, as part of peer to peer communication with the access point, the set of identifiers corresponding to the communications device includes transmitting one or more signals in a peer to peer communications channel. A communications device, in accordance with some embodiments, comprises: at least one processor configured to: generate a set of identifiers corresponding to the communications device which are to be advertised by an access point on behalf of the communications device; and upload, as part of peer to peer communication with said access point, the set of identifiers corresponding to the communications device. The exemplary communications device further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
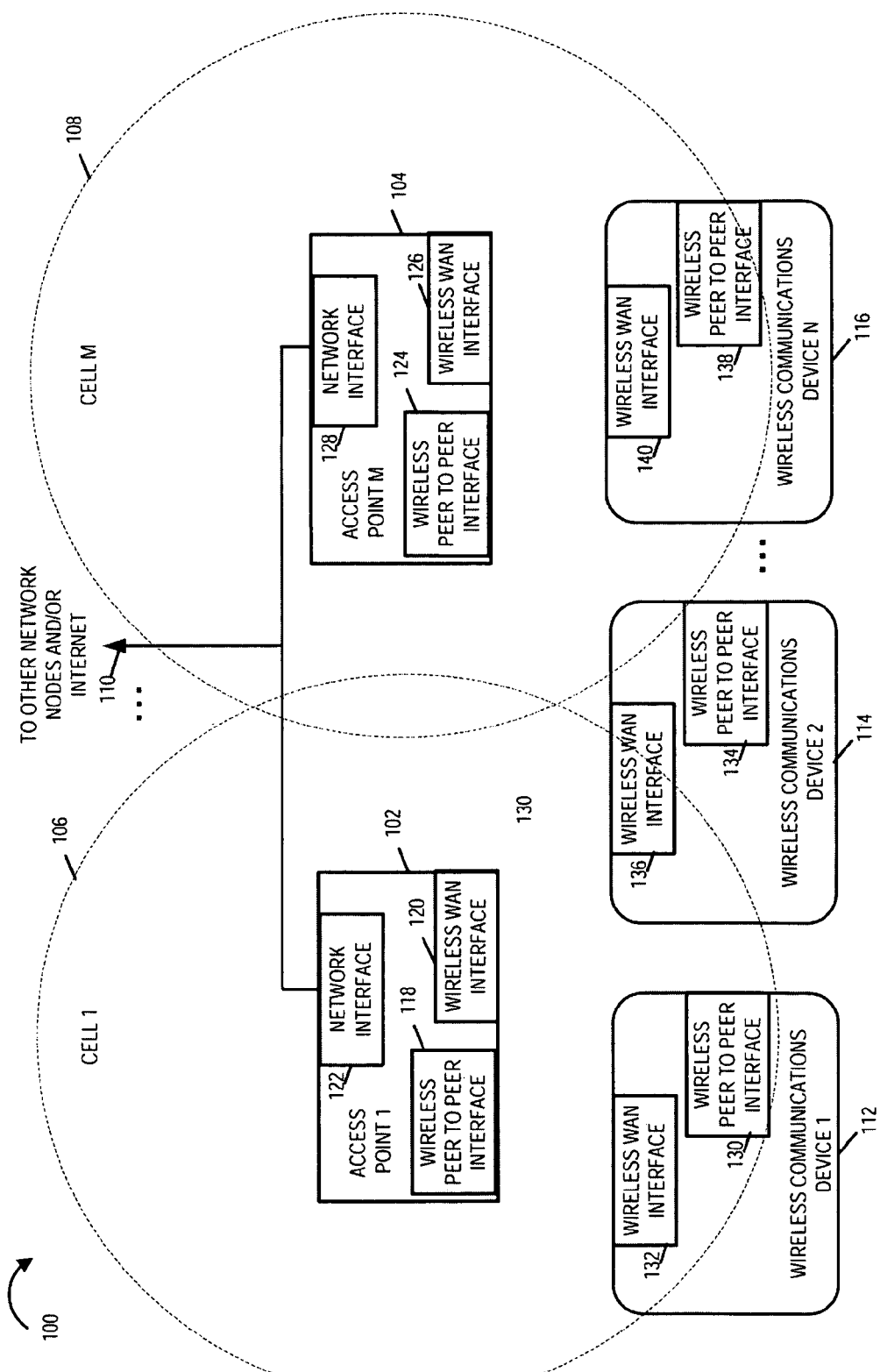
FIG. 1 is a drawing of an exemplary communications system including a plurality of access points and a plurality of wireless communications devices in accordance with an exemplary embodiment.

FIG. 1 is a drawing of an exemplary communications system 100 including a plurality of access points, e.g., base stations, (access point 1 102, . . . , access point M 104) and a plurality of wireless communications devices, e.g., mobile wireless terminals, (wireless communications device 1 112, wireless communications device 2 114, . . . , wireless communications device N 116). Access point 1 102 includes a wireless peer to peer interface 118, a wireless wide area network interface 120, and a network interface 122. Access point 1 102 has a corresponding wireless wide area network cellular coverage region represented by cell 1 106. Access point M 104 includes a wireless peer to peer interface 124, a wireless wide area network interface 126, and a network interface 128. Access point M 104 has a corresponding wireless wide area network cellular coverage region represented by cell M 108. The network interfaces (122, . . . , 128) are coupled to a backhaul network 110 which couples the access points (102, . . . , 104) to other network nodes and/or the Internet.

Wireless communications device 1 112 includes a wireless peer to peer interface 130 and a wireless wide area network interface 132. Wireless communications device 2 114 includes a wireless peer to peer interface 134 and a wireless wide area network interface 136. Wireless communications device N 116 includes a wireless peer to peer interface 138 and a wireless wide area network interface 140.

A wireless communications device may, and sometimes does, communicate with another wireless communications device or an access point in its local vicinity via peer to peer signaling with the two devices in communication using their peer to peer interfaces. A wireless communications device may, and sometimes does, communicate with an access point in whose cell it is situated, with the wireless communications device and the access point using their wireless WAN interfaces.

In some situations, peer to peer signaling has advantages over WAN signaling, while in other situations WAN signaling has advantages over peer to peer signaling. For example, peer to peer signaling, in some embodiments, is more efficient and/or well suited for communicating small amounts of information relatively frequently and/or for use in localized networks such as localized ad-hoc networks, while WAN signaling, in some embodiments is more efficient and/or well suited for communicating large blocks of information and/or supporting communications between two widely spaced end nodes.

In some embodiments, the peer to peer signals are transmitted in the same frequency band as the frequency band used for wide area network signals. In some other embodiments, the peer to peer signals are transmitted in a different frequency band as the frequency band used for wide area network signals. In still other embodiments, in some regions the peer to peer signals are transmitted in the same frequency band as the frequency band used for wide area network signals, while in other regions the peer to peer signals are transmitted in a different frequency band as the frequency band used for wide area network signals.

Figure 2:
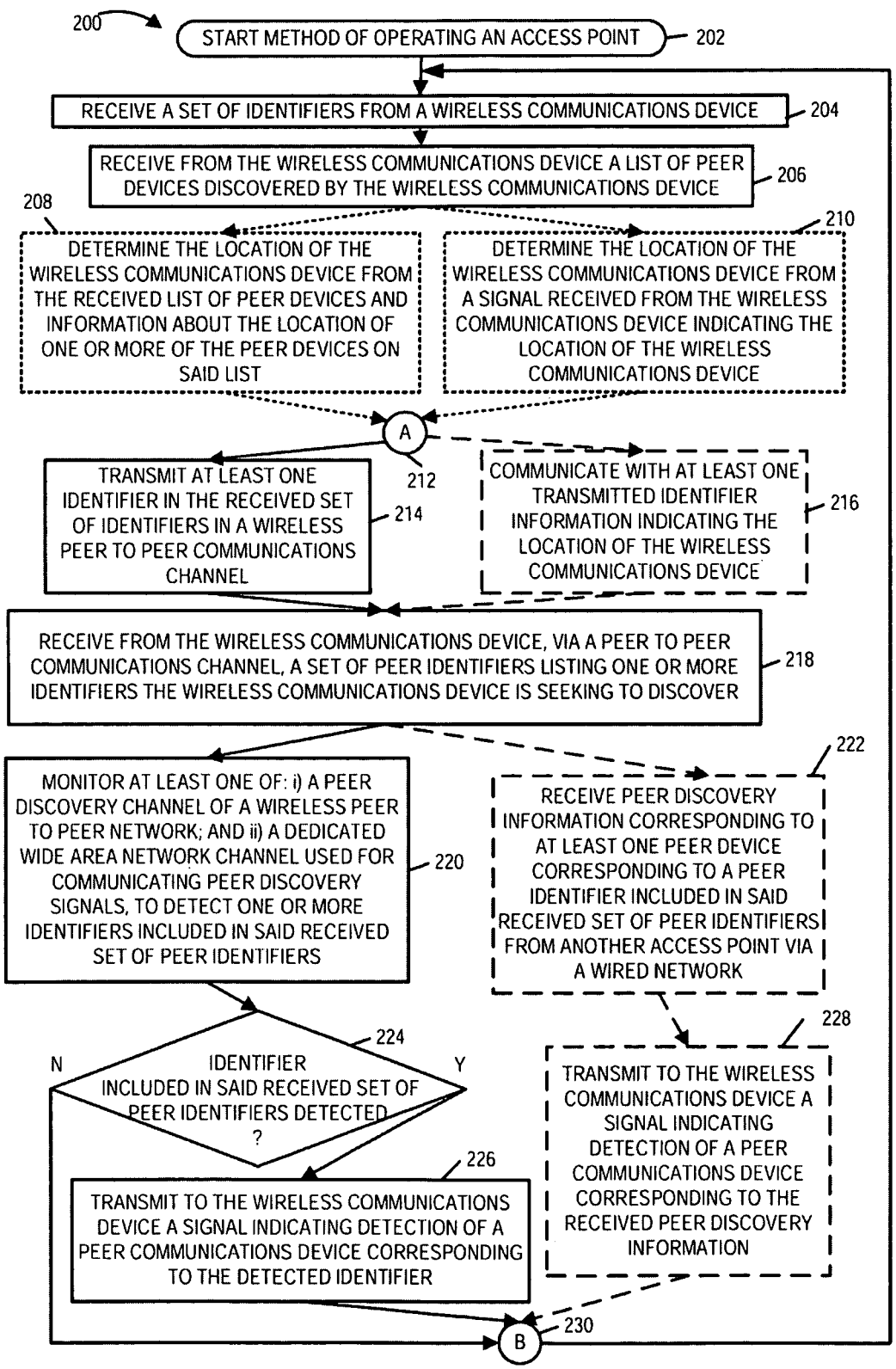
FIG. 2 is a flowchart of an exemplary method of operating an access point in accordance with an exemplary embodiment.

FIG. 2 is a flowchart 200 of an exemplary method of operating an access node, e.g., base station, in accordance with an exemplary embodiment. Operation starts in step 202, where the access point is powered on and initialized and proceeds to step 204. In step 204 the access point receives a set of identifiers from a wireless communications device. In some embodiments, the set of identifiers includes identifiers which are to be advertised by the access point on behalf of the wireless communications device.

Operation proceeds from step 204 to step 206. In step 206 the access point receives from the wireless communications device a list of peer devices discovered by the wireless communications device. Operation proceeds from step 206 to one of step 208 and step 210. In step 208 the access point determines the location of the wireless communications device from the received list of peer devices and information about the location of one or more of the peer devices on said list. In some embodiments, the access point receives information about the location of one or more peer devices on said list from another access point. In step 210 the access point determines the location of the wireless communications device from a signal received form the wireless communications device indicating the location of the wireless communications device. For example, the signal received from the wireless communications device indicating the location of the wireless communications device includes wireless communications device GPS determined location information. Operation proceeds from step 208 or step 210 via connecting node A 212 to step 214. In some embodiments, operation also proceeds from step 208 or step 210 via connecting node A 212 to optional step 216.

In step 214 the access point transmits at least one identifier in the received set of identifiers in a wireless peer to peer communications channel. In some embodiments, the wireless peer to peer communications channel is a peer to peer discovery channel and transmitting the at least one identifier includes transmitting the at least one identifier on a communications resource corresponding to said wireless communications device. In some such embodiments, the communications resource is a set of tone-symbols, e.g., a set of orthogonal frequency division multiplexing (OFDM) tone-symbols, where a tone symbol is the air link resource of one tone for one symbol transmission time interval. Operation proceeds from step 214 to step 218. Returning to step 216, in step 216 the access point communicates, with at least one transmitted identifier, information indicating the location of the wireless communications device. Operation proceeds from step 216 to step 218.

In step 218 the access point receives from the wireless communications device, via a peer to peer communications channel, a set of peer identifiers listing one or more identifiers the wireless communications device is seeking to discover. Operation proceeds from step 218 to step 220. In some embodiments, operation may, and sometimes does, also proceed from step 218 to step 222.

Returning to step 220, in step 220 the access point monitors at least one of: i) a peer discovery channel if a wireless peer to peer network; and ii) a dedicated wide are network channel for communicating peer discovery signals, to detect one or more identifiers included in said received set of peer identifiers. Operation proceeds from step 220 to step 224.

In step 224 the access point, determines whether or not an identifier included in said received set of peer identifiers has been detected. If an identifier included in said received set of peer identifiers has been detected, operation proceeds from step 224 to step 226, where the access point transmits to the wireless communications device a signal indicating detection of a peer communications device corresponding to the detected identifier. In some embodiments, the transmitted signal of step 226 includes information indicating the location of the detected peer communications device. Operation proceeds from step 226 to connecting node B 230. Returning to step 224, if in step 224 it is determined that an identifier included in said received set of peer identifiers has not been detected by the monitoring of step 220, then operation proceeds from step 224 to connecting node B 230.

Returning to step 222, in step 222 the access point receives peer discovery information corresponding to at least one peer device corresponding to a peer identifier included in said received set of peer identifiers from an access point via a wired network. Operation proceeds from step 222 to step 228, in which the access point transmits to wireless communications device a signal indicating detection of a peer communications device corresponding to the detected identifier received in step 222. In some embodiments, the transmitted signal of step 228 includes information indicating the location of the detected peer communications device. Operation proceeds from step 228 to connecting node B 230. Operation proceeds from connecting node B 230 to the input of step 204.

Figure 3:
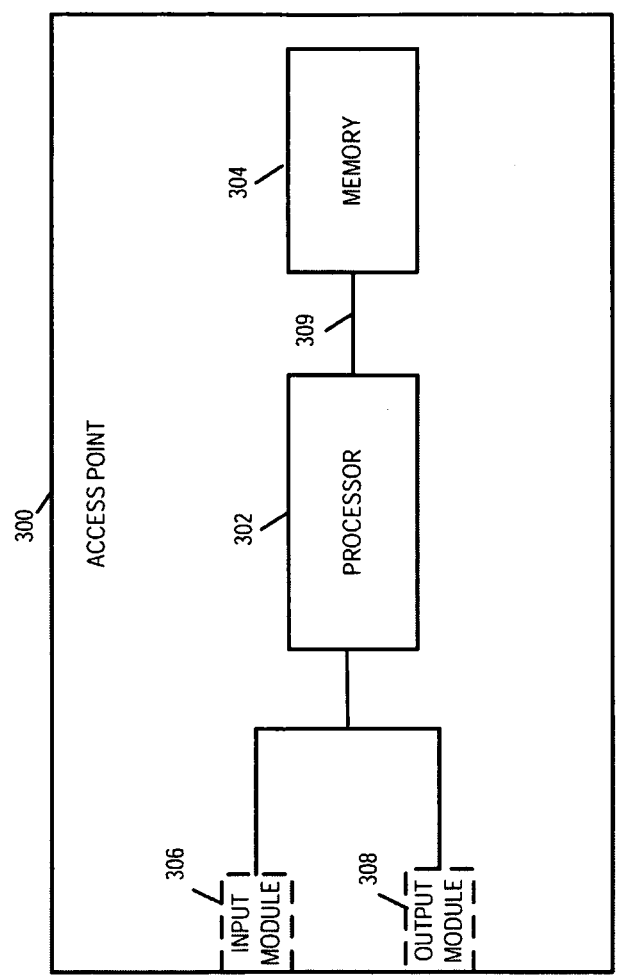
FIG. 3 is a drawing of an exemplary access point, in accordance with an exemplary embodiment.

FIG. 3 is a drawing of an exemplary access point 300, e.g., base station, in accordance with an exemplary embodiment. Exemplary access point 300 is, e.g., one of the access points of FIG. 1. Exemplary access point 300 may, and sometimes does, implement a method in accordance with flowchart 200 of FIG. 2.

Access point 300 includes a processor 302 and memory 304 coupled together via a bus 309 over which the various elements (302, 304) may interchange data and information. Access point 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output.

Processor 302 is configured to: receive a set of identifiers from a wireless communications device; and transmit at least one identifier in the received set of identifiers in a wireless peer to peer communications channel. In some embodiments the set of identifiers includes identifiers which are to be advertised by the access point on behalf of the wireless communications device.

In various embodiments, said wireless peer to peer communications channel is a peer to peer discovery channel; and processor 302 is configured to transmit the at least one identifier on a communication resource corresponding to said wireless communications device, as part of being configured to transmit the at least one identifier. The communications resource is, e.g., a set of tone-symbols.

Processor 302 is further configured to communicate, with at least one transmitted identifier, information indicating the location of the wireless communications device. Processor 302, in some embodiments, is further configured to: determine the location of the said wireless communications device from a signal received from said wireless communications device indicating the location of the wireless communications device. The received location information may be wireless communications device GPS determined location information.

Processor 302 is further configured to: receive, from the wireless communications device, a list of peer devices discovered by the wireless communications device. In some embodiments, processor 302 is further configured to determine the location of the wireless communications device from the received list of peer devices and information about the location of one or more of the peer devices on said list. Processor 302 may be, and sometimes is, configured to receive information about the location of one or more peer devices on said list from another access point.

Processor 302, in some embodiments, is further configured to: receive from the wireless communications device, via a peer to peer communications channel, a set of peer identifiers listing one or more identifiers the wireless communications device is seeking to discover; and monitor at least one of: i) a peer discovery channel of a wireless peer to peer network and ii) a dedicated wide area network channel used for communicating peer discovery signals, to detect one or more identifiers included in said received set of peer identifiers.

Processor 302, in various embodiments, is further configured to: transmit to the wireless communication device a signal indicating detection of a peer communications device corresponding to said detected identifier, in response to said monitoring detecting an identifier included in said received set of peer identifiers. The transmitted signal, in some embodiments, includes information indicating the location of the detected peer communications device.

Processor 302, in some embodiments, is further configured to: receive peer discovery information, corresponding to said at least one peer device corresponding to a peer identifier included in said received set of peer identifiers, from another access point via a wired network.

Figure 4:
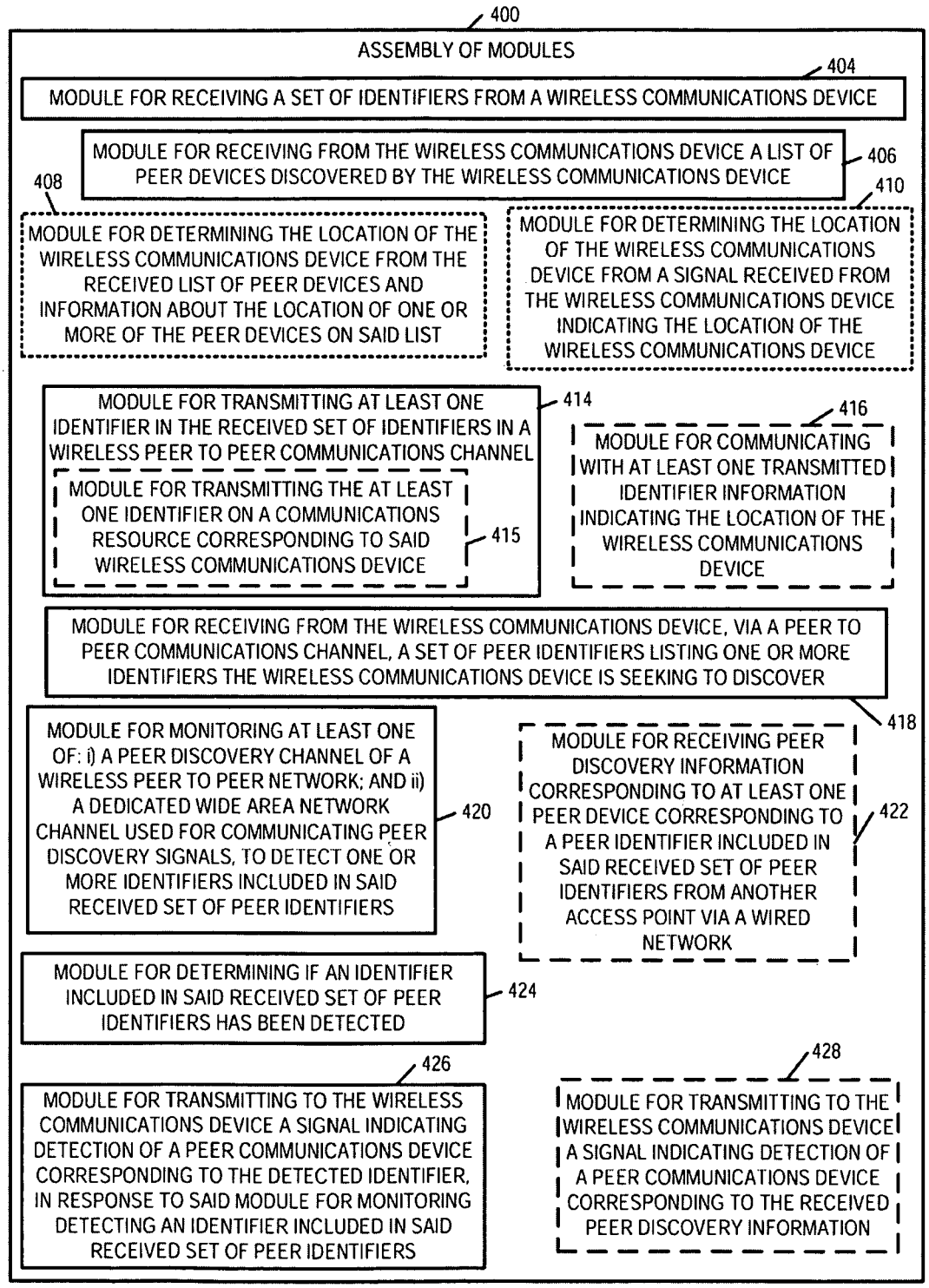
FIG. 4 is an assembly of modules which can, and in some embodiments is, used in the access point illustrated in FIG. 3.

FIG. 4 is an assembly of modules 400 which can, and in some embodiments is, used in the access point 300 illustrated in FIG. 3. The modules in the assembly 400 can be implemented in hardware within the processor 302 of FIG. 3, e.g., as individual circuits. Alternatively, the modules may be implemented in software and stored in the memory 304 of the access point 300 shown in FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of module 400. In embodiments where the assembly of modules 400 is stored in the memory 304, the memory 304 is a computer program product comprising a computer readable medium comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the access point 300 or elements therein such as the processor 302, to perform the functions of the corresponding steps illustrated in the method flowchart 200 of FIG. 2.

Assembly of modules 400 includes a module 404 for receiving a set of identifiers from a wireless communications device and a module 406 for receiving from the wireless communications device a list of peer devices discovered by the wireless communications device. In some embodiments, the set of identifiers includes identifiers which are to be advertised by the access point, e.g., base station, including assembly of modules 400 on behalf of the wireless communications device. Assembly of modules 400 further includes one or more of: a module 408 for determining the location of the wireless communications device from the received list of peer devices and information about the location of one or more of the peer devices on said list and a module 410 for determining the location of the wireless communications device from a signal received from the wireless communications device indicating the location of the wireless communications device. In some embodiments, the access point including assembly of modules 400 includes the information about the location of one or more peer devices on said list from another access point, e.g., a neighboring access point which is adjacent said access point including assembly of modules 400. The signal received from the wireless device indicating the location of the wireless communications device is, in some embodiments, a signal conveying wireless communications device GPS determined location information.

Assembly of modules 400 further includes a module 414 for transmitting at least one identifier in the received set of identifiers in a wireless peer to peer communications channel, and in some embodiments, a module 416 for communicating, with at least one transmitted identifier, information indicating the location of the wireless communications device. In various embodiments, module 414 includes a module 415 for transmitting the at least one identifier on a communications resource corresponding to said wireless communication device. The communication resource is, e.g., a set of tone-symbols. In some embodiments, the wireless peer to peer communications channel is a peer to peer discovery channel.

Assembly of modules 400 further includes a module 418 for receiving from the wireless communications device, via a peer to peer communications channel, a set of peer identifiers listing one or more identifiers that the wireless communications device is seeking to discover, a module 420 for monitoring at least one of: i) a peer discovery channel of a wireless peer to peer network and ii) a dedicated wide area network channel used for communicating peer discovery signals, to detect one or more identifiers included in said received set of peer identifiers, a module 424 for determining if an identifier included in said received set of peer identifiers has been detected, and a module 426 for transmitting to the wireless communications device a signal indicating detection of a peer communications device corresponding to the detected identifier, in response to said module 420 for monitoring detecting an identifier included in said received set of peer identifiers. In some embodiments, the signal transmitted by module 426 includes information indicating the location of the detected peer communications device.

In some embodiments assembly of modules 400 further includes a module 422 for receiving peer discovery information corresponding to at least one peer device corresponding to a peer identifier included in said received set of peer identifiers from another access point via a wired network and a module 428 for transmitting to the wireless communications device a signal indicating detection of a peer communications device corresponding to the received peer discovery information. In some embodiments, the signal transmitted by module 428 includes information indicating the location of the detected peer communications device.

Figure 5:
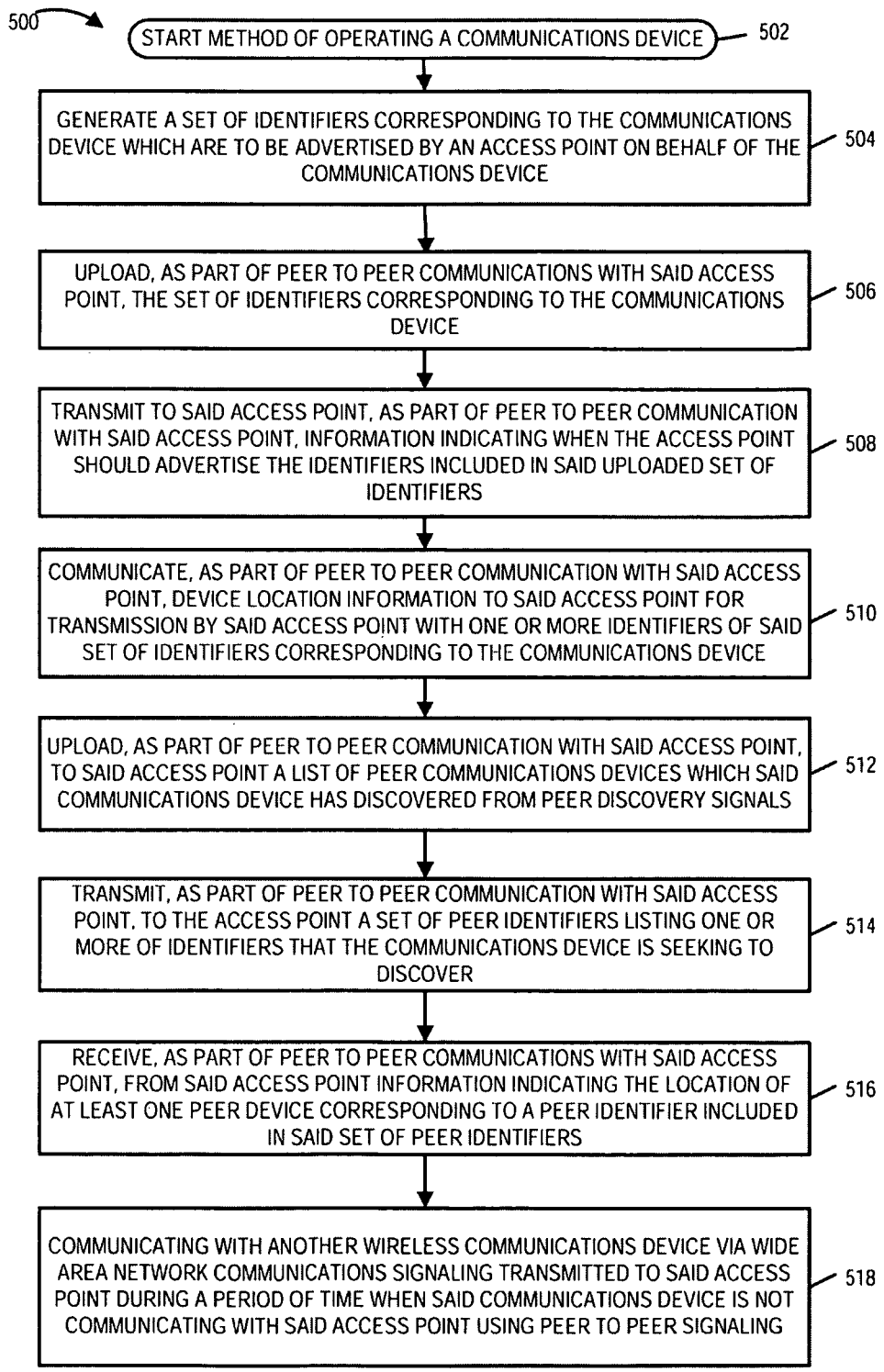
FIG. 5 is a flowchart of an exemplary method of operating a communications device in accordance with an exemplary embodiment.

FIG. 5 is a flowchart 500 of an exemplary method of operating a communications device, e.g., a wireless mobile node, in accordance with an exemplary embodiment. Operation starts in step 502 where the communications device is powered on and initialized and proceeds to step 504.

In step 504 the communications device generates a set of identifiers corresponding to the communications device which are to be advertised by and access point on behalf of the communications device. Then, in step 506 the communications device uploads, as part of peer to peer communications with said access point, the set of identifiers corresponding to the communications device. In some embodiments, the uploading, as part of peer to peer communication with said access point, of the set of identifiers corresponding to the communications device includes using one or more signals transmitted in a peer to peer communications channel. Operation proceeds from step 506 to step 508.

In step 508 the communications device transmits to said access point, as part of peer to peer communications with said access point, information indicating when said access point should advertise the identifiers include in said uploaded set of identifiers. Operation proceeds from step 508 to step 510.

In step 510 the communications device communicates as part of peer to peer communications with said access point, device location information to said access point for transmission by said access point with one or more identifiers of said set of identifiers corresponding to the communications device. In some embodiments, the location information is determined from GPS. Operation proceeds from step 510 to step 512.

In step 512 the communications device uploads, as part of peer to peer communications with said access point, to said access point a list of peer communications devices which said communications device has discovered from peer discovery signals. Then, in step 514 the communications device transmits, as part of peer to peer communications with said access point, to the access point a set of peer identifiers listing one or more identifier that the communications device is seeking to discover. Operation proceeds from step 514 to step 516.

In step 516 the communications device receives, as part of peer to peer communications with said access point, from said access point information indicating the location of at least one peer device corresponding to a peer identifier included in said set of peer identifiers. Operation proceeds from step 516 to step 518.

In step 518 the communications device communicates with another communications device via wide area network communications signaling transmitted to said access point during a period of time when said communications device is not communicating with said access point using peer to peer signaling. The peer to peer communications signals may be transmitted in the same or a different frequency band than the wide area network signals, e.g., cellular signals, used to support a communications session with said another wireless communications device via the access node.

Figure 6:
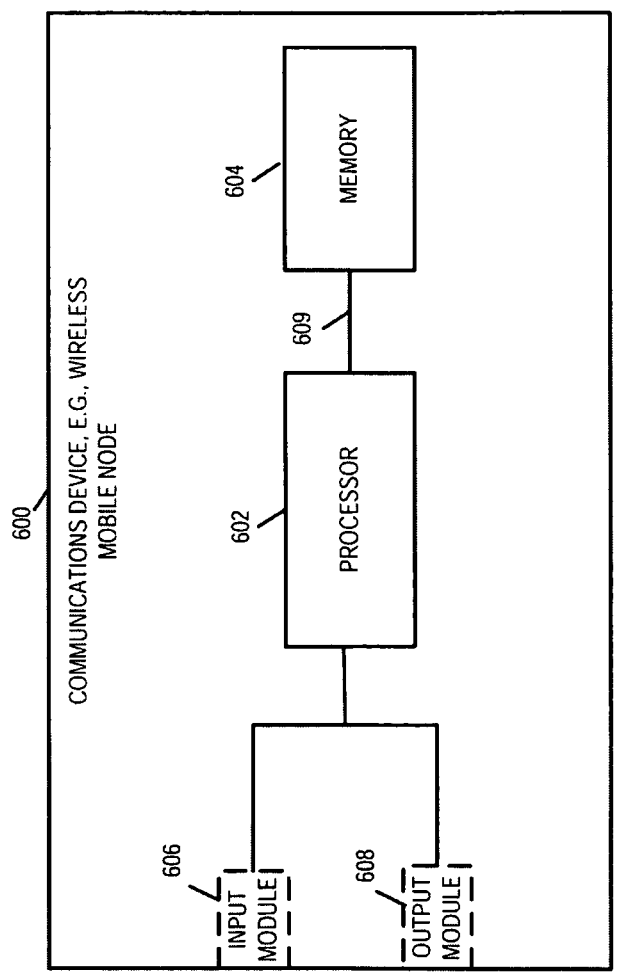
FIG. 6 is a drawing of an exemplary communications device, in accordance with an exemplary embodiment.

FIG. 6 is a drawing of an exemplary communications device 600, e.g., a wireless mobile node, in accordance with an exemplary embodiment. Exemplary communications device 600 is, e.g., one of the wireless communications devices of FIG. 1. Exemplary communications device 600 may, and sometimes does, implement a method in accordance with flowchart 500 of FIG. 5.

Communications device 600 includes a processor 602 and memory 604 coupled together via a bus 609 over which the various elements (602, 604) may interchange data and information. Communications device 600 further includes an input module 606 and an output module 608 which may be coupled to processor 602 as shown. However, in some embodiments, the input module 606 and output module 608 are located internal to the processor 602. Input module 606 can receive input signals. Input module 606 can, and in some embodiments does, include a wireless receiver and/or a wired or optical input interface for receiving input. Output module 608 may include, and in some embodiments does include, a wireless transmitter and/or a wired or optical output interface for transmitting output.

Processor 602 is configured to: generate a set of identifiers corresponding to the communications device which are to be advertised by an access point on behalf of the communications device; and upload, as part of peer to peer communication with said access point, the set of identifiers corresponding to the communications device. In some embodiments, the uploading, as part of peer to peer communication with said access point, of the set of identifiers corresponding to the communications device uses one or more signals transmitted in a peer to peer communications channel.

Processor 602 is further configured to: transmit to said access point, as part of peer to peer communication with said access point, information indicating when the access point should advertise identifiers included in said uploaded set of identifiers; and communicate, as part of peer to peer communication with said access point, device location information to said access point for transmission by said access point with one or more identifiers of said set of identifiers corresponding to the communications device. In some embodiments, the device location information is determined from GPS information.

Processor 602 is further configured to: upload, as part of peer to peer communication with said access point, to said access point a list of peer communications devices which said communications device has discovered from peer discovery signals; transmit, as part of peer to peer communication with said access point, to the access point a set of peer identifiers listing one or more identifiers that the communications device is seeking to discover; and receive, as part of peer to peer communication with said access point, from the access point information indicating the location of at least one peer device corresponding to a peer identifier included in said set of peer identifiers.

Processor 602 is further configured to communicate with another wireless communications device via wide area network communications signaling transmitted to said access point during a period of time when said communications device is not communicating with said access point using peer to peer signaling. In some embodiments, peer to peer communications signals are transmitted in the same frequency band as the frequency band used for wide area network signals, e.g., cellular signals. In some other embodiments, peer to peer communications signals are transmitted in a different frequency band as the frequency band used for wide area network signals, e.g., cellular signals. In some embodiments, in some regions peer to peer communications signals are transmitted in the same frequency band as the frequency band used for wide area network signals, while in other regions peer to peer communications signals are transmitted in a different frequency band as the frequency band used for wide area network signals. The wide area network may be used to support a communications session with another wireless communications device via the access node. The another wireless communications device may be located in the same or a different cell as the wireless communications device is located.

Figure 7:
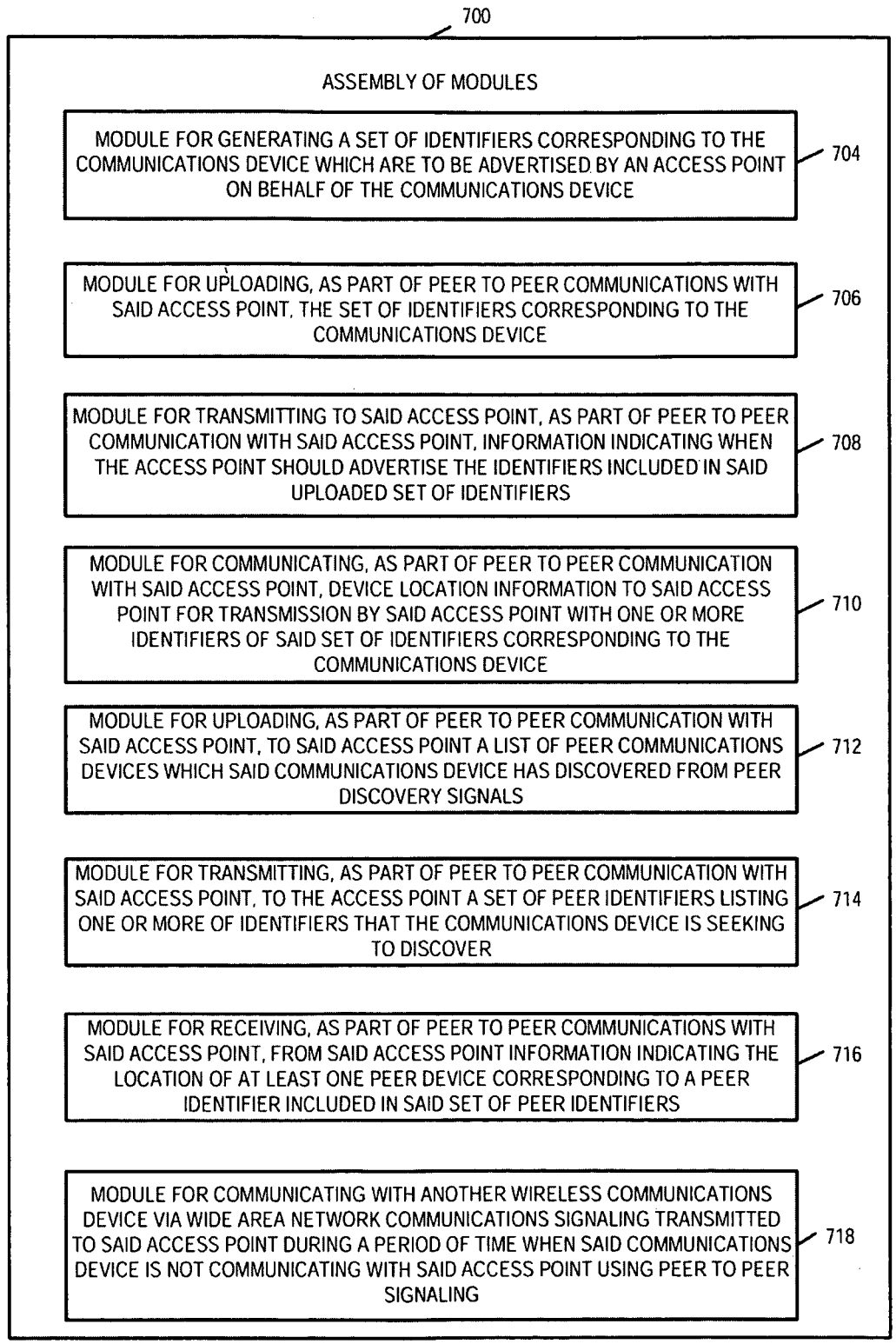
FIG. 7 is an assembly of modules which can, and in some embodiments is, used in the communications device illustrated in FIG. 6.

FIG. 7 is an assembly of modules 700 which can, and in some embodiments is, used in the communications device 600 illustrated in FIG. 6. The modules in the assembly 700 can be implemented in hardware within the processor 602 of FIG. 6, e.g., as individual circuits. Alternatively, the modules may be implemented in software and stored in the memory 604 of the communications device 600 shown in FIG. 6. While shown in the FIG. 6 embodiment as a single processor, e.g., computer, it should be appreciated that the processor 602 may be implemented as one or more processors, e.g., computers. When implemented in software the modules include code, which when executed by the processor, configure the processor, e.g., computer, 602 to implement the function corresponding to the module. In some embodiments, processor 602 is configured to implement each of the modules of the assembly of modules 700. In embodiments where the assembly of modules 700 is stored in the memory 604, the memory 604 is a computer program product comprising a computer readable medium comprising code, e.g., individual code for each module, for causing at least one computer, e.g., processor 602, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 7 control and/or configure the communications device 600 or elements therein such as the processor 602, to perform the functions of the corresponding steps illustrated in the method flowchart 500 of FIG. 5.

Assembly of modules 700 includes a module 704 for generating a set of identifiers corresponding to the communications device which are to be advertised by an access point on behalf of the communications device, a module 706 for uploading, as part of peer to peer communication with said access point, the set of identifiers corresponding to the communications device, a module 708 for transmitting to said access point, as part of peer to peer communication with said access point, information indicating when said access point should advertise the identifiers included in said uploaded set of identifiers, and a module 710 for communicating, as part of peer to peer communication with said access point, device location information to said access point for transmission by said access point with one or more identifiers of said set of identifiers corresponding to communications device.

Assembly of modules 700 also includes: a module 712 for uploading, as part of peer to peer communication with said access point, to said access point a list of peer communications devices with which said communications device has discovered from peer discovery signals, a module 714 for transmitting, as part of peer to peer communication with said access point, to the access point a set of peer identifiers listing one or more identifiers that the communications device is seeking to discover, and a module 716 for receiving, as part of peer to peer communications with said access point, from said access point information indicating the location of at least one peer device corresponding to a peer identifier included in said set of peer identifiers. Assembly of modules further includes a module 718 for communicating with another wireless communications device via wide area network communications signaling transmitted to said access point during a period of time when said wireless communications device is not communicating with said access point using peer to peer signaling.

Figure 8:
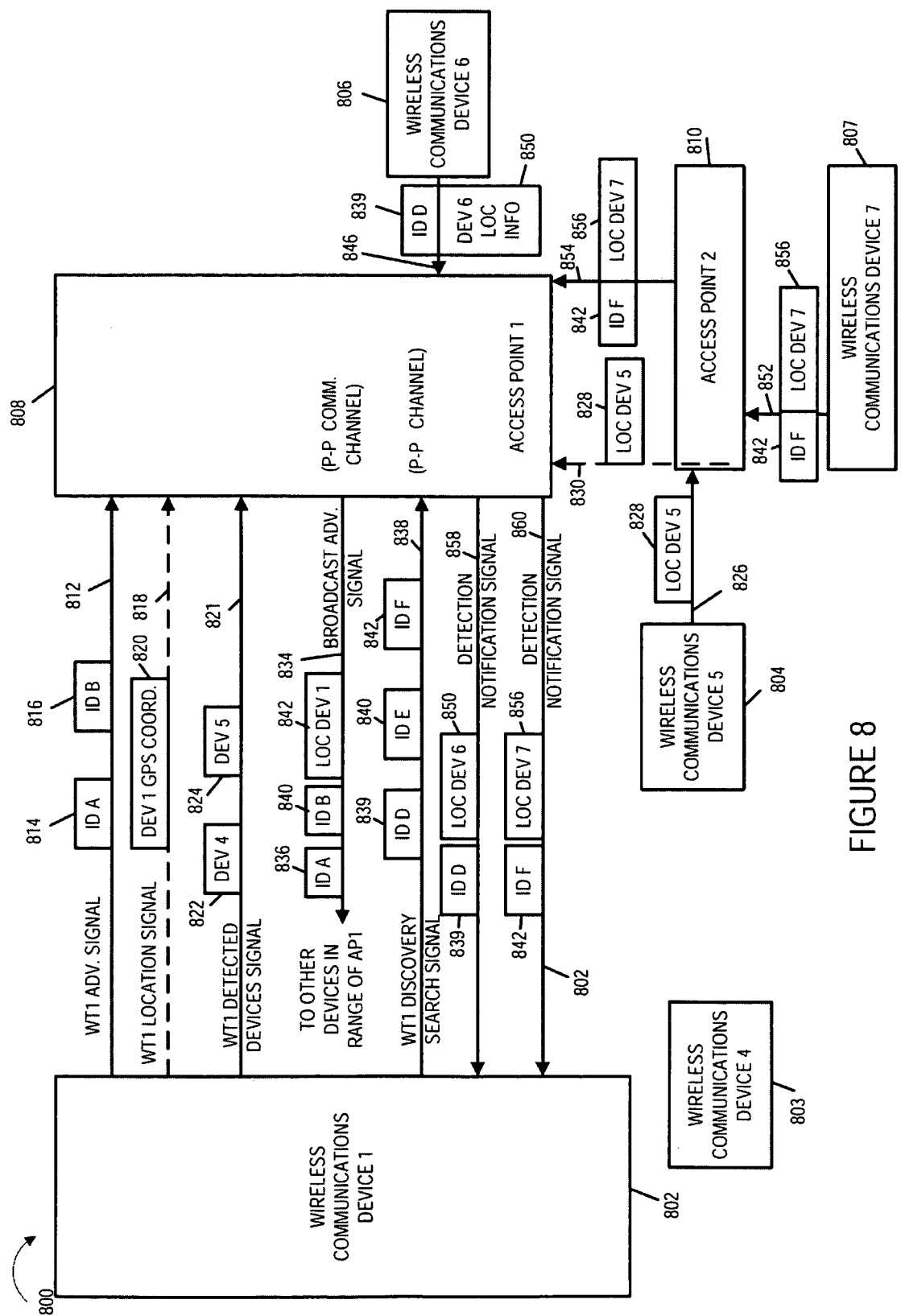
FIG. 8 is a drawing including a plurality of wireless communications devices and a plurality of access points and illustrates exemplary signaling in accordance with some embodiments.

FIG. 8 is a drawing 800 including a plurality of wireless communications devices (wireless communications device 1 802, wireless communications device 4 803, wireless communications device 5 804, wireless communications device 6 806, wireless communications device 7 807) and a plurality of access points, e.g., base stations, (access point 1 808, access point 2 810) and illustrates exemplary signaling in accordance with some embodiments. The wireless communications devices (802, 803, 804, 806, 807) may be any of the wireless communications devices of system 100 of FIG. 1, while the access points (808, 810) may be any of the access points of system 100 of FIG. 1. Access point 1 808 may implement the method of flowchart 200 of FIG. 2 and/or be implemented in accordance with FIG. 3 and/or FIG. 4.

Wireless communications device 1 802 generates and transmits wireless terminal 1 advertisement signal 812. Advertisement signal 812 includes a set of identifiers (identifier A 814, identifier B 816) which are to be advertised by access point 1 808 on behalf of wireless communications device 1 802. Access point 1 808 receives the advertisement signal 812. The advertisement signal 812 may also be, and sometimes is, recovered by other wireless communications devices which happen to be in the vicinity of wireless communications device 1 802.

Wireless communications device 1 802 monitors for other wireless communications devices currently in its local vicinity. In this example, wireless communications device has detected the presence of device 4 803 and device 5 804. Wireless communications device 1 802 generates and transmits wireless terminal 1 detected devices signal 821 which conveys information 822 indicating that device 4 has been detected and information 824 indicating that device 5 has been detected. Access point 1 808 receives signal 821 including the list of peer devices discovered by wireless communications device 1 802.

In some embodiments, wireless communications device 1 802 determines its own position, e.g., via GPS, and generates and transmits a wireless terminal 1 location signal 818 including device 1's GPS coordinate information 820. In such an embodiment, access point 1 808 receives signal 818 and recover the device 1 location information.

Wireless communications device 5 804, which is in the vicinity of access point 2 810, generates a location signal 826 including device 5 location information 828 which it transmits to access point 2 810. Access point 2 810 transmits signal 830 conveying device 5 location information 828 over the wired backhaul network to access point 1 808.

In some embodiments, access point 1 808 determines the location of wireless communications device 1 802 from the received list of detected peer devices and information about one or more devices on the list. For example, access point 1 808 knows that device 5 804 is in the vicinity of device 1 802 from signal 821 and knows the location of device 5 804 from device 5 location information 828 recovered from signal 830. Access point 1 808 approximates the position of device 1 802 using that information. In some embodiments, a measured power level of a received known signal from wireless communications device 1 802 is also used in the communications device 1 position determination. In some embodiments, there is collaboration between multiple access points in determining the position of wireless communications device 1 802.

Access point 1 808 generates and transmits broadcast advertisement signal 834 including identifier A 836, identifier B 840 and device 1 location information 842. Signal 834 is available to be received and recovered by other wireless communications devices in wireless range of access point 1 808. Broadcast advertisement signal 834 is transmitted over a peer to peer communications channel, e.g., a peer to peer discovery channel. In some embodiments, the signal 834 is communicated on a communications resource, e.g., a set of tone-symbols, corresponding to wireless communications device 1 802.

Wireless communications device 1 802 generates and transmits a wireless terminal 1 discovery search signal 838 to access point 1 808. Discovery search signal includes a set of peer identifiers listing identifiers that wireless communications device 1 802 is seeking to discover. In this example, discovery search signal 838 includes identifier D 839, identifier E 840 and identifier F 842. WT 1 discovery search signal 838 is received by access point 1 808 via a peer to peer communications channel.

Access point 1 808 monitors a peer discovery channel of a wireless peer to peer network and/or a dedicated wide area network channel using for communicating peer discovery signals to detect one or more of the identifiers included in the received set of peer identifiers {ID D, ID E, ID F}. In this example, access point 1 808 detects signal 846 from wireless communications device 6 806 conveying identifier D 839 and device 6 location information 850. In response to the monitoring detecting identifier ID D 839 which was in the received set of peer identifiers {ID D, ID E, ID F}, access point 1 808 generates and transmits to wireless communications device 1 802 detection notification signal 858 which includes identifier ID D 839 and device 6 location information 850.

Wireless communications device 7 807, which is in the vicinity of access point 2 810, generates and transmits peer discovery signal 852 conveying identifier ID F 842 and device 7 location information 856. Access point 2 810 generates signal 854 conveying information ID F 842 and device 7 location information 856 and transmits the generated signal 854 via a wired backhaul network to access point 1 808. Access point 1 808 recognizes that wireless communications device 1 802 is seeking a device corresponding to ID F 842. Access point 1 808 generates and transmits detection notification signal 860 including identifier ID F 842 and device 7 location information 856 to wireless communications device 1 802.

It should be appreciated that access point 1 808 has increased the detectable region for wireless communications device 1 advertisements via the transmission of broadcast advertisement signal 834. For example, wireless communications device 6 806 may be able to detect and recover signal 834 from access point 1 808 but may be unable to detect and recover signal 812 from wireless communications device 1 802. It should also be appreciated that access point 1 808 has increased the detectable range of search for wireless communications device 1 802. For example wireless communications device 1 802 is made aware of discovery signals of interest from wireless communications device 6 806 and wireless communications device 7 807, via access point 1 808, which are otherwise out of direct peer to peer discovery signaling detection by wireless communications device 1 802.

Figure 9:
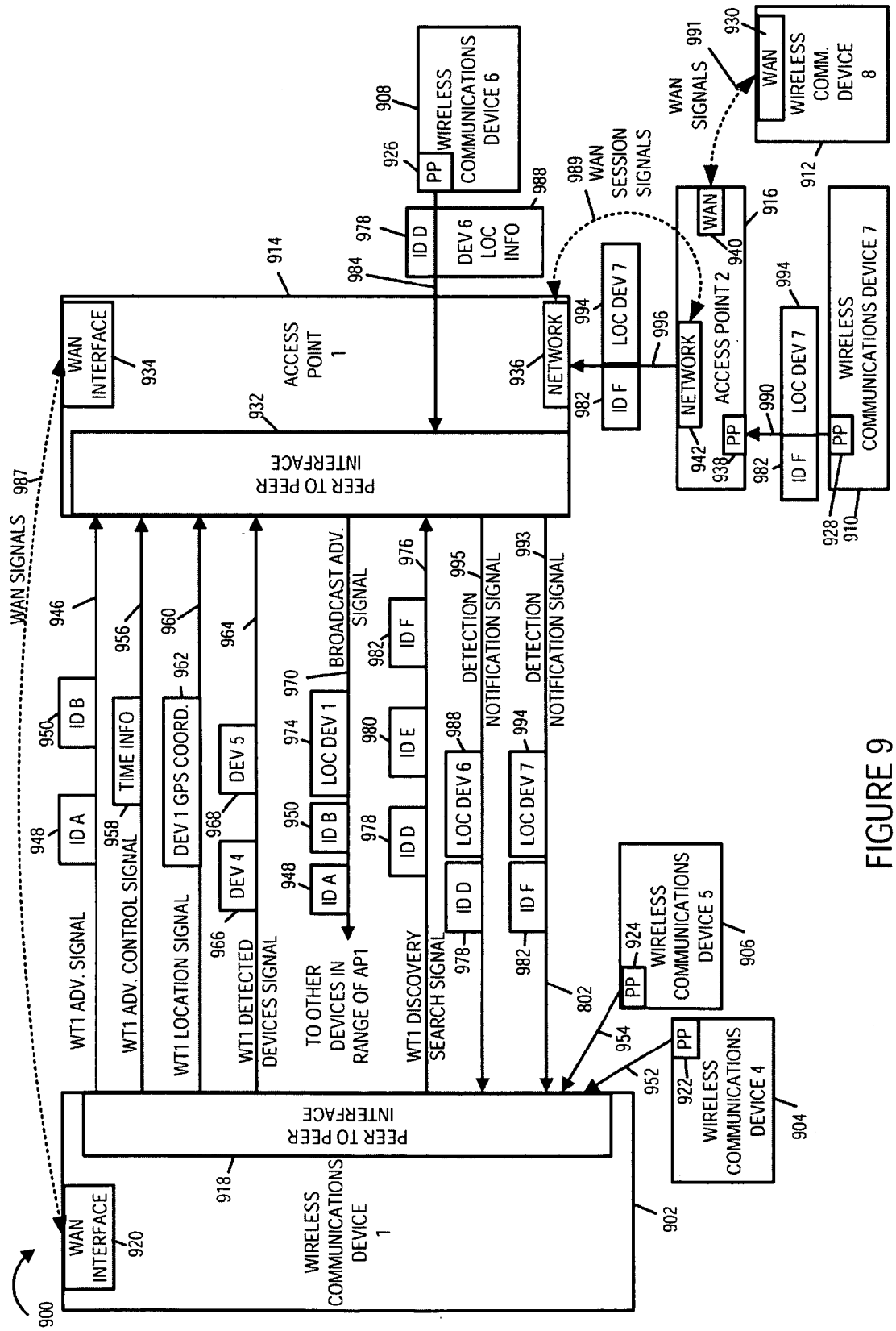
FIG. 9 is a drawing including a plurality of wireless communications devices and a plurality of access points and illustrates exemplary signaling in accordance with some embodiments.

FIG. 9 is a drawing 900 including a plurality of wireless communications devices (wireless communications device 1 902, wireless communications device 4 904, wireless communications device 5 906, wireless communications device 6 908, wireless communications device 7 910, wireless communications device 8 912) and a plurality of access points, e.g., base stations, (access point 1 914, access point 2 916) and illustrates exemplary signaling in accordance with some embodiments. The wireless communications devices (902, 904, 906, 908, 910, 912) may be any of the wireless communications devices of system 100 of FIG. 1, while the access points (914, 916) may be any of the access points of system 100 of FIG. 1. Wireless communications device 1 902 may implement a method in accordance with flowchart 500 of FIG. 5 and/or be implemented in accordance with FIG. 6 and/or FIG. 7.

Wireless communications device 1 902 includes peer to peer interface 918 and WAN interface 920. Wireless communications devices (904, 906, 908, 910) includes peer to peer interfaces (922, 924, 926, 928), respectively, and wireless communications device 8 912 includes WAN interface 930. Access point 1 914 includes peer to peer interface 932, WAN interface 934, and network interface 936. Access point 2 916 includes peer to peer interface 938, WAN interface 940, and network interface 942. Wireless communications device 1 902 generates a set of identifiers corresponding to the wireless communications device 1 902 which are to be advertised by access point 1 914 on behalf of wireless communications device 1 902. In the example of FIG. 9, the set of identifiers={identifier A 948, identifier B 950}. Device 1 902 generates wireless terminal 1 advertisement signal 946 conveying ID A 948 and ID B 950. Device 1 902 uploads as part of peer to peer communications with access point 1 914 the set of identifiers corresponding to device 1 902, e.g., transmitting signal 946 in a peer to peer communications channel. In some embodiments, multiple signals may be generated and transmitted to convey the list of identifiers to be advertised, e.g. one identifier per signal or with the list of identifiers encoded over several signals.

Device 1 902 also transmits to access point 1 914, as part of peer to peer communications with access point 1 914, information indicating when the access point 1 914 should advertise identifiers included in said updated set of identifiers. In the example of FIG. 9, device 1 902 generates and transmits wireless terminal 1 advertisement control signal 956 including time information 958. Time information 958 includes, e.g., information identifying a time range during which the uploaded list of identifiers should be broadcast and/or information identifying a timeout time when access point 1 914 should cease broadcasting the uploaded list of identifiers.

Device 1 902 also transmits, as part of peer to peer communications with access point 1 914, wireless terminal 1 location signal 960 including device 1 GPS coordinate information 962 to access point 1 914 for subsequent transmission by access point 1 914 with one or more identifiers in the set of identifiers corresponding to device 1 902.

Device 1 902 monitors for the presence of other wireless communications devices currently situated within its peer to peer reception range. Device 1 902 detects signal 952 from wireless communications device 904 and signal 954 from wireless communications device 5 906. Device 1 902 generates wireless terminal 1 detected devices signal 964 which includes an identifier for device 4 966 and an identifier for device 5 968. Device 1 902 uploads, as part of peer to peer communications with access point 1 914, to access point 1 914 generated signal 964 conveying a list of peer communications devices (device 4 ID 966, device 5 ID 968) which device 1 902 has discovered from peer discovery signals (952, 954), respectively.

Access point 1 914 has received signals (946, 956, 960 and 964) and recovered the information being conveyed by those signals. Access point 1 914 generates broadcast advertisement signal 970 which includes identifier A 948, identifier B 950 and device 1 location information 974. In some embodiments device 1 location information 974 is a copy of device 1 GPS coordinate information 962. In some embodiments, device 1 location information 974 may be, and sometimes is, derived from measurements and/or information corresponding to one or more access points, e.g., power measurements of known signals at one or more access points, and/or information estimating device 1's position based on the location of other wireless communications device which device 1 902 has detected whose positions are known. Access point 1 914 transmits the broadcast advertisement signal 970 for device 1 902 at the time in accordance with time information 958.

Wireless communications device 1 902 creates a list of peer identifiers that it would like to discover, and generates wireless terminal 1 discovery search signal 976. In the example of FIG. 9 device 1 902 is searching for identifier D 978, identifier E 980 and identifier F 982. Device 1 902 transmits, as part of peer to peer communications, with access point 1 902, to access point 1 914 discovery search signal 976 conveying identifiers ID D 978, ID E 980 and ID F 982 that device 1 902 is seeking to discover. Access point 1 914 receives and processes wireless terminal 1 discovery search signal 976.

Access point 1 914 has received peer to peer signals 984 from wireless communications device 6 908 conveying identifier D 978 and device 6 location information 988. Access point 1 914 generates and transmits detection notification signal 995 conveying identifier ID D 978 and device 6 location information 988 to device 1 902. Device 1 902 receives and processes detection notification signal 995. Device 1 902 can and sometimes does take action in response to the detection notification, e.g., change position to attempt to move within direct peer to peer communication range of device 6 908, estimate arrival time at which device 6 908 will be within direct peer to peer communications range, increase transmission power level, etc.

Access point 2 916 has received peer to peer signals 990 from wireless communications device 7 910 conveying identifier F 982 and device 7 location information 994. Access point 2 transmits signal 996 to access point 1 914 via the backhaul network conveying identifier ID F 982 and device 7 location information 994. Access point 1 914 recognizes that device 1 902 is searching for a device corresponding to identifier F 982. Access point 1 914 generates and transmits detection notification signal 993 conveying identifier ID F 982 and device 7 location information 994 to device 1 902. Device 1 902 receives and processes detection notification signal 993. Device 1 902 can, and sometimes does take action in response to the detection notification, e.g., change position to attempt to move closer to direct peer to peer communication range of device 7 910, estimate arrival time at which device 7 910 will be within direct peer to peer communications range, decide that peer to peer communications with device 7 910 will not be feasible in an acceptable time window and therefore initiates a WAN communications session with wireless communications device 7 910 via its WAN interface.

Wireless communications device 1 902 communicates with wireless communications device 8 912 via wide area network communications signaling including signaling transmitted to access point 1 914 during a period of time when communications device 1 902 is not communicating with access point 1 914 using peer to peer signaling. WAN signaling related to the WAN communications session between device 1 902 and device 8 912 includes WAN signals 987 over an airlink between device 1 902 and access point 1 914 using WAN interfaces (920, 934), respectively. WAN signaling related to the WAN communications session between device 1 902 and device 8 912 also includes WAN session signals 989 over the backhaul between access point 1 914 and access point 2 916. WAN signaling related to the WAN communications session between device 1 902 and device 8 912 also includes WAN signals 991 over an airlink between access point 2 916 and wireless communications device 8 912. The peer to peer communications signals may be transmitted in the same or a different frequency band than the frequency band used for wide area network signaling.

Various features of various embodiments will now be described. In some peer-to-peer wireless networks, a wireless communications device, e.g. a mobile station, signals its presence through broadcasting its various peer IDs to other wireless communications devices. Its various peer IDs may include private IDs, e.g., for friends, private groups, etc., and/or public IDs, e.g., for gaming, public groups, etc. In some embodiments, the wireless communications device also keeps a list of peer IDs that identify other network users. The list of peer IDs that identify other network users include, e.g., private IDs obtained from friends and public IDs distributed by restaurants and stores. When the wireless communications device is in the vicinity of another wireless communications device who is advertising its ID, the wireless communications device may decode the ID and go through its ID list to match if the discovered ID is of any interest.

Often, a wireless communications device, e.g., a battery powered mobile node, has limitations on transmit power, processing power, etc. Therefore, the range of discovering and being discovered for a wireless commuications device, e.g., mobile station, in a pure peer to peer network may be limited. In various embodiments, the wireless communications device which is part of a peer to peer network can seek help from the access points, e.g., base stations in a WAN to extend their peer discovery range. In various embodiments access points include both peer to peer and WAN interfaces. In some embodiments, both the wireless communications devices and the access points include peer to peer and WAN interfaces.

In some embodiments, a push-based approach is used. Various embodiments using a push-based approach will now be described. A wireless communications device may request an access point including WAN capability to help in peer discovery. In some embodiments the wireless communications device uploads to the base station the various peer IDs that it intends to advertise, potentially indicating how often and when the base station should advertise each of the IDs. In some embodiments, the access point transmits the ID signals in the peer to peer frame structure as if it is assuming the wireless communication device's identity in the peer to peer network. In some embodiments, the access point transmits the ID signals in a dedicated WAN channel for peer discovery. In some embodiments, the access point transmits the ID signals in a dedicated peer to peer channel for peer discovery rebroadcasting. In some embodiments, the access point transmits the ID signals through a WAN traffic channel to some wireless communications devices that are specified by the requesting wireless communications device. In various embodiments, the access point cooperates with other access points through the wired network to further extend the range of the peer ID advertisement of the wireless communications device.

In some embodiments, the wireless communications device provides its location information obtained through GPS to the access point to advertise its location information along with its IDs. In some embodiments, the wireless communications device may, and sometimes does, request the access point to help on acquiring its location information, e.g., if it cannot provide its location information by itself. If the wireless communications device uploads, to the access point, a list of peers that it has discovered, the access point can, and sometimes does, estimate the location of the wireless communications device from the location information of the other peers.

In some embodiments, the wireless communications device uploads various peer IDs that it intends to discover to the access point; the access point notifies the wireless communications device if there is a match. The access point, in some embodiments, monitors the peer discovery channel in the peer to peer frame structure as if it is a wireless communications device in the peer to peer network. In some embodiments, the access point monitors some dedicated WAN channel for peer discovery. In some embodiments, the access point monitors some dedicated peer to peer channel for peer discovery rebroadcast corresponding to other access points, e.g., adjacent access points. The access point, in various embodiments, obtains peer discovery information from other access points through the wired network.

In some embodiments, the wireless communications device uploads various peer IDs that it intends to discover to the access point; the access point notifies the wireless communications device if there is a match and the location information of the match when it is available and/or requested by the wireless communications device. Several access points may, and sometimes do, cooperate to obtain a wireless communications device's approximate location information.

Some embodiments use a pull-based approach. Various embodiments using a pull-based approach will now be described. An access point, e.g. WAN base station which includes both WAN and peer to peer interfaces, monitors the peer discovery channel of the peer to peer network and decide whether or not to assist some peer to peer wireless communications devices on advertising and decoding IDs according to some criteria. One possible criteria, used in some embodiments, is the received peer discovery power of the wireless communications device transmitted signal as measured at the access point by the access point. If the received power is small, it implies that other peer to peer wireless communications devices in the vicinity of the access point may have difficulties to discover the aforementioned peer to peer wireless communications device, and in such a situation the access point may decide to assist, e.g., decide to rebroadcast the received identifier.

In some embodiments the access point, e.g., WAN base station including a WAN interface and peer to peer interface, decodes the ID information of a wireless communications device that it thinks is in need of help in advertising peer IDs. In some embodiments, the access point re-transmits the decoded ID information using the same peer to peer discovery resource as the wireless communications device being helped. In some embodiments, the access point re-transmits the decoded ID information using the a peer to peer discovery resource associated with wireless communications device in a set of peer to peer resources allocated for rebroadcasting. The access point may or may not know the meaning of the ID information. In some embodiments, the access point signals its intention to help, e.g., through the WAN, to the wireless communications device that it thinks is in need of help for peer discovery. In some embodiments, the access point requests the ID and/or location information from the wireless communications device for peer ID advertisement. In some embodiments, the access point offers to acquire the location information of the wireless communications device and advertise it if it can not be provided by the wireless communications device itself.

In some embodiments, the access point offers to provide a list of available active peer IDs to the wireless communications device. The access point, in some embodiments, requests a list of interested IDs or a mask for interested IDs from the wireless communications device.

The techniques of various embodiments may be implemented using software, hardware and/or a combination of software and hardware. In some embodiments, modules are implemented as physical modules. In some such embodiments, the individual physical modules are implemented in hardware, e.g., as circuits, or include hardware, e.g., circuits, with some software. In other embodiments, the modules are implemented as software modules which are stored in memory and executed by a processor, e.g., general purpose computer. Various embodiments are directed to apparatus, e.g., stationary wireless nodes, mobile nodes such as mobile access terminals of which cell phones are but one example, access point such as base stations including one or more attachment points, servers, and/or communications systems. Various embodiments are also directed to methods, e.g., method of controlling and/or operating wireless communications devices including mobile and/or stationary nodes, access points such as base stations, server nodes and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, receiving a set of identifiers from a wireless communications device; and transmitting at least one identifier in the received set of identifiers in a wireless peer to peer communications channel. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications device, including a processor configured to implement one, multiple or all of the steps of one or more methods of the invention.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

In some embodiments, the processor or processors, e.g., CPUs, of one or more devices, e.g., communications devices such as wireless terminals are configured to perform the steps of the methods described as being as being performed by the communications device. Accordingly, some but not all embodiments are directed to a device, e.g., communications device, with a processor which includes a module corresponding to each of the steps of the various described methods performed by the device in which the processor is included. In some but not all embodiments a device, e.g., communications device, includes a module corresponding to each of the steps of the various described methods performed by the device in which the processor is included. The modules may be implemented using software and/or hardware.

While various features are described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), GSM and/or various other types of communications techniques which may be used to provide wireless communications links, e.g., WAN wireless communications links, between access points and wireless communications device such as mobile nodes and wireless communications. The methods and apparatus may be, and in various embodiments are, used with CDMA, orthogonal frequency division multiplexing (OFDM), GSM and/or various other types of communications techniques which may be used to provide wireless communications links, e.g., direct peer to peer wireless communications links, between wireless communications devices including peer to peer interfaces. In some embodiments a wireless communications device including both a wide area network interface and a peer to peer network interface uses different communications techniques for the different interfaces, e.g., one of CDMA and GSM based techniques for the WAN interface and OFDM based techniques for the peer to peer interface. In some embodiments the access points are implemented as base stations which establish communications links with mobile nodes using CDMA, GSM and/or OFDM. In various embodiments the mobile nodes are implemented as notebook computers, personal data assistants (PDAs), or other portable devices including receiver/transmitter circuits and logic and/or routines, for implementing the methods.

What is claimed is:

1. A method of operating an access point, comprising:
receiving a set of identifier's from a wireless communications device, said set of
  identifiers including private or public identifiers to be advertised on behalf of the wireless communications device, said set of identifiers including an identifier used to signal a presence of the wireless communications device to other wireless communications devices; and
  transmitting at least one identifier in the received set of identifiers in a wireless peer to peer discovery channel.

2. The method of claim 1, further comprising:
communicating, with at least one identifier transmitted in said wireless peer to peer discovery channel, information indicating the location of the wireless communications device.

3. The method of claim 2, further comprising:
determining the location of the said wireless communications device from a signal received from said wireless communications device indicating the location of the wireless communications device.

4. The method of claim 2, further comprising:
receiving, from the wireless communications device, a list of peer devices discovered by the wireless communications device; and
determining the location of the wireless communications device from the received list of peer devices and information about the location of one or more of the peer devices on said list.

5. The method of claim 1, further comprising:
receiving from the wireless communications device, via a peer to peer communications channel, a set of peer identifiers listing one or more identifiers the wireless communications device is seeking to discover; and
monitoring at least one of: i) the wireless peer to peer discovery channel or ii) a dedicated wide area network channel used for communicating peer discovery signals, to detect one or more identifiers included in said received set of peer identifiers.

6. The method of claim 5, further comprising:
in response to said monitoring detecting an identifier included in said received set of peer identifiers, transmitting to the wireless communication device a signal indicating detection of a peer communications device corresponding to said detected identifier.

7. The method of claim 1, wherein said set of identifiers includes at least one private identifier or public identifier corresponding to a friend, relative, business associate, or common interest.

8. An access point, comprising:
means for receiving a set of identifiers from a wireless communications device said set of identifiers including private or public identifiers to be advertised on behalf of the wireless communications device, said set of identifiers including an identifier used to signal a presence of the wireless communications device to other wireless communications devices; and
means for transmitting at least one identifier in the received set of identifiers in a wireless peer to peer discovery channel.

9. The access point of claim 8, further comprising:
means for communicating, with at least one identifier transmitted in said wireless peer to peer discovery channel, information indicating the location of the wireless communications device.

10. The access point of claim 9, further comprising:
means for determining the location of the said wireless communications device from a signal received from said wireless communications device indicating the location of the wireless communications device.

11. The access point of claim 9, further comprising:
means receiving, from the wireless communications device, a list of peer devices discovered by the wireless communications device; and
means for determining the location of the wireless communications device from the received list of peer devices and information about the location of one or more of the peer devices on said list.

12. A computer program product for use in an access point, the computer program product comprising:
a non-transitory computer readable medium comprising:
  code for causing at least one computer to receive a set of identifiers from a wireless communications device, said set of identifiers including private or public identifiers to be advertised on behalf of the wireless communications device, said set of identifiers including an identifier used to signal a presence of the wireless communications device to other wireless communications devices; and
  code for causing said at least one computer to transmit at least one identifier in the received set of identifiers in a wireless peer to peer discovery channel.

13. An access point comprising:
at least one processor configured to:
  receive a set of identifiers from a wireless communications device, said set of identifiers including private or public identifiers to be advertised on behalf of the wireless communications device, said set of identifiers including an identifier used to signal a presence of the wireless communications device to other wireless communications devices; and
  transmit at least one identifier in the received set of identifier's in a wireless peer to peer discovery channel; and
memory coupled to said at least one processor.

14. The access point of claim 13, wherein said at least one processor is further configured to:
communicate, with at least one identifier transmitted in said wireless peer to peer discovery channel, information indicating the location of the wireless communications device.

15. The access point of claim 14, wherein said at least one processor is further configured to:
  determine the location of the said wireless communications device from a signal received from said wireless communications device indicating the location of the wireless communications device.

16. A method of operating a communications device, the method comprising:
  generating a set of identifiers corresponding to the communications device, said set of identifiers including private or public identifiers to be advertised by an access point over a wireless peer to peer discovery channel on behalf of the communications device, said set of identifiers including an identifier used to signal a presence of the communications device to other wireless communications devices; and
  uploading, as part of peer to peer communication with said access point, the set of identifiers corresponding to the communications device.

17. The method of claim 16, further comprising:
  transmitting to said access point, as part of peer to peer communication with said access point, information indicating when the access point should advertise identifiers included in said uploaded set of identifiers.

18. The method of claim 16, further comprising:
  communicating, as part of peer to peer communication with said access point, device location information to said access point for transmission by said access point with one or more identifiers of said set of identifiers corresponding to the communications device.

19. The method of claim 16,
  wherein said set of identifiers includes at least one private identifier or public identifier corresponding to a friend, relative, business associate, or common interest, the method further comprising:
  uploading, as part of peer to peer communication with said access point, to said access point a list of peer communications devices which said communications device has discovered from peer discovery signals.

20. The method of claim 16, further comprising:
  transmitting, as part of peer to peer communication with said access point, to the access point a set of peer identifiers listing one or more identifiers that the communications device is seeking to discover; and
  receiving, as part of peer to peer communication with said access point, from the access point information indicating the location of at least one peer device corresponding to a peer identifier included in said set of peer identifiers.

21. A communications device comprising:
  means for generating a set of identifiers corresponding to the communications device, said set of identifiers including private or public identifiers to be advertised by an access point over a wireless peer to peer discovery channel on behalf of the communications device, said set of identifiers including an identifier used to signal a presence of the communications device to other wireless communications devices; and
  means for uploading, as part of peer to peer communication with said access point, the set of identifiers corresponding to the communications device.

22. The communications device of claim 21, further comprising:
  means for transmitting to said access point, as part of peer to peer communication with said access point, information indicating when the access point should advertise identifiers included in said uploaded set of identifiers.

23. The communications device of claim 21, further comprising:
  means for communicating, as part of peer to peer communication with said access point, device location information to said access point for transmission by said access point with one or more identifiers of said set of identifiers corresponding to the communications device.

24. The communications device of claim 21,
  wherein said set of identifiers includes at least one private identifier or public identifier corresponding to a friend, relative, business associate, or common interest, the communications device further comprising:
  means for uploading, as part of peer to peer communication with said access point, to said access point a list of peer communications devices which said communications device has discovered from peer discovery signals.

25. The communications device of claim 21, further comprising:
  means for transmitting, as part of peer to peer communication with said access point, to the access point a set of peer identifiers listing one or more identifiers that the communications device is seeking to discover; and
  means for receiving, as part of peer to peer communication with said access point, from the access point information indicating the location of at least one peer device corresponding to a peer identifier included in said set of peer identifiers.

26. A computer program product for use in a communications device, the computer program product comprising:
  a non-transitory computer readable medium comprising:
  code for causing at least one computer to generate a set of identifiers corresponding to the communications device, said set of identifiers including private or public identifiers to be advertised by an access point over a wireless peer to peer discovery channel on behalf of the communications device, said set of identifiers including an identifier used to signal a presence of the communications device to other wireless communications devices; and
  code for causing said at least one computer to upload, as part of peer to peer communication with said access point, the set of identifiers corresponding to the communications device.

27. A communications device comprising:
  at least one processor configured to:
  generate a set of identifiers corresponding to the communications device, said set of identifiers including private or public identifiers to be advertised by an access point over a wireless peer to peer discovery channel on behalf of the communications device, said set of identifier's including an identifier used to signal a presence of the communications device to other wireless communications devices: and
  upload, as part of peer to peer communication with said access point, the set of identifier's corresponding to the communications device; and
  memory coupled to said at least one processor.

28. The communications device of claim 27, wherein said at least one processor is further configured to transmit to said access point, as part of peer to peer communication with said access point, information indicating when the access point should advertise identifiers included in said uploaded set of identifiers.

29. The communications device of claim 27, wherein said at least one processor is further configured to communicate, as part of peer to peer communication with said access point, device location information to said access point for transmission by said access point with one or more identifiers of said set of identifiers corresponding to the communications device.

30. The communications device of claim 27, wherein said set of identifiers includes at least one private identifier or public identifier corresponding to a friend, relative, business associate, or common interest; and wherein said at least one processor is further configured to upload, as part of peer to peer communication with said access point, to said access point a list of peer communications devices which said communications device has discovered from peer discovery signals.

31. A method of operating an access point, comprising:
receiving from a wireless communications device, via a peer to peer communications channel, a set of peer identifiers listing one or more identifiers the wireless communications device is seeking to discover;
monitoring at least one of: i) a wireless peer to peer discovery channel of a wireless peer to peer network, or ii) a dedicated wide area network channel used for communicating peer discovery signals, to detect one or more identifiers included in said received set of peer identifiers; and
in response to said monitoring detecting an identifier included in said received set of peer identifiers, transmitting to the wireless communication device a signal indicating detection of a peer communications device corresponding to said detected identifier.

32. An access point, comprising:
means for receiving from a wireless communications device, via a peer to peer communications channel, a set of peer identifiers listing one or more identifiers the wireless communications device is seeking to discover;
means for monitoring at least one of: i) a wireless peer to peer discovery channel of a wireless peer to peer network, or ii) a dedicated wide area network channel used for communicating peer discovery signals, to detect one or more identifiers included in said received set of peer identifiers; and
means for transmitting to the wireless communication device a signal indicating detection of a peer communications device corresponding to an identifier in response to said means for monitoring detecting said identifier included in said received set of peer identifiers.

33. An access point comprising: at least one processor configured to:
receive from a wireless communications device, via a peer to peer communications channel, a set of peer identifiers listing one or more identifiers the wireless communications device is seeking to discover;
monitor at least one of: i) a wireless peer to peer discovery channel of a wireless peer to peer network, or ii) a dedicated wide area network channel used for communicating peer discovery signals, to detect one or more identifiers included in said received set of peer identifiers; and
transmit to the wireless communication device a signal indicating detection of a peer communications device corresponding to an identifier, in response to detecting said identifier included in said received set of peer identifiers; and
a memory coupled to said at least one processor.

34. A computer program product for use in an access point, the computer program product comprising:
a non-transitory computer readable medium comprising:
code for causing at least one computer to receive from a wireless communications device, via a peer to peer communications channel, a set of peer identifiers listing one or more identifiers the wireless communications device is seeking to discover;
code for causing said at least one computer to monitor at least one of: i) a wireless peer to peer discovery channel of a wireless peer to peer network, or ii) a dedicated wide area network channel used for communicating peer discovery signals, to detect one or more identifiers included in said received set of peer identifiers; and
code for causing said at least one computer to transmit to the wireless communication device a signal indicating detection of a peer communications device corresponding to an identifier, in response to detecting said identifier included in said received set of peer identifier.

* * * * *